United States Patent [19]

Silver

[11] Patent Number: 4,691,253
[45] Date of Patent: Sep. 1, 1987

[54] ELECTRONIC IMAGING CAMERA FOR RECORDING EITHER MOVING OR STILL IMAGES

[75] Inventor: Bruce R. Silver, Weston, Mass.

[73] Assignee: Polaroid Corporation, Cambridge, Mass.

[21] Appl. No.: 733,046

[22] Filed: May 13, 1985

[51] Int. Cl.⁴ .................. H04N 5/78; H04N 5/76; H04J 5/782

[52] U.S. Cl. .................. 360/33.1; 360/10.1; 358/312; 358/906; 358/335

[58] Field of Search ............... 358/44, 213, 310, 312, 358/335, 906, 224, 909; 360/10.1, 33.1

[56] References Cited

U.S. PATENT DOCUMENTS

| | | | |
|---|---|---|---|
| 4,057,830 | 11/1977 | Adcock | 358/127 |
| 4,130,834 | 12/1978 | Mender et al. | 358/127 |
| 4,131,919 | 12/1978 | Lloyd et al. | 358/906 X |
| 4,163,256 | 7/1979 | Adcock | 358/127 |
| 4,262,301 | 4/1981 | Erlichman | 358/6 |
| 4,366,501 | 12/1982 | Tsunekawa et al. | 358/310 |
| 4,420,773 | 12/1983 | Toyoda et al. | 358/335 |
| 4,456,931 | 6/1984 | Toyoda et al. | 358/335 |
| 4,463,387 | 7/1984 | Hashimoto et al. | 358/310 |
| 4,468,710 | 8/1984 | Hashimoto et al. | 360/9.1 |
| 4,527,205 | 7/1985 | Kinoshi | 358/909 X |
| 4,541,010 | 9/1985 | Alston | 358/44 |
| 4,544,960 | 10/1985 | Konishi | 360/35.1 |
| 4,546,390 | 10/1985 | Konishi et al. | 360/10.3 |
| 4,551,764 | 11/1985 | Ogawa | 358/225 X |
| 4,553,170 | 11/1985 | Aoki et al. | 358/906 X |
| 4,558,368 | 12/1985 | Aoki et al. | 358/906 X |
| 4,571,627 | 2/1986 | Stempeck | 358/224 |
| 4,581,652 | 4/1986 | Kinoshita et al. | 358/213 |
| 4,584,613 | 4/1986 | Aman et al. | 358/906 X |
| 4,589,031 | 5/1986 | Tsuji | 358/224 X |
| 4,599,657 | 7/1986 | Kinoshita et al. | 358/906 X |

FOREIGN PATENT DOCUMENTS

| | | | |
|---|---|---|---|
| 2916387 | 10/1979 | Fed. Rep. of Germany | 358/906 |
| 54-140510 | 10/1979 | Japan | 358/906 |
| 54-140507 | 10/1979 | Japan | 358/906 |

*Primary Examiner*—Aristotelis M. Psitos
*Attorney, Agent, or Firm*—Edward S. Roman

[57] ABSTRACT

An electronic imaging camera is provided for recording either continuous moving video images in analog format or high resolution still images in digital format. The electronic imaging camera includes an electronic viewfinder in which either the continuous moving images or low resolution still images may be played back. An accessory may be releasably connected to the electronic imaging camera to facilitate playback of the high resolution still images on a separate video display device.

9 Claims, 1 Drawing Figure

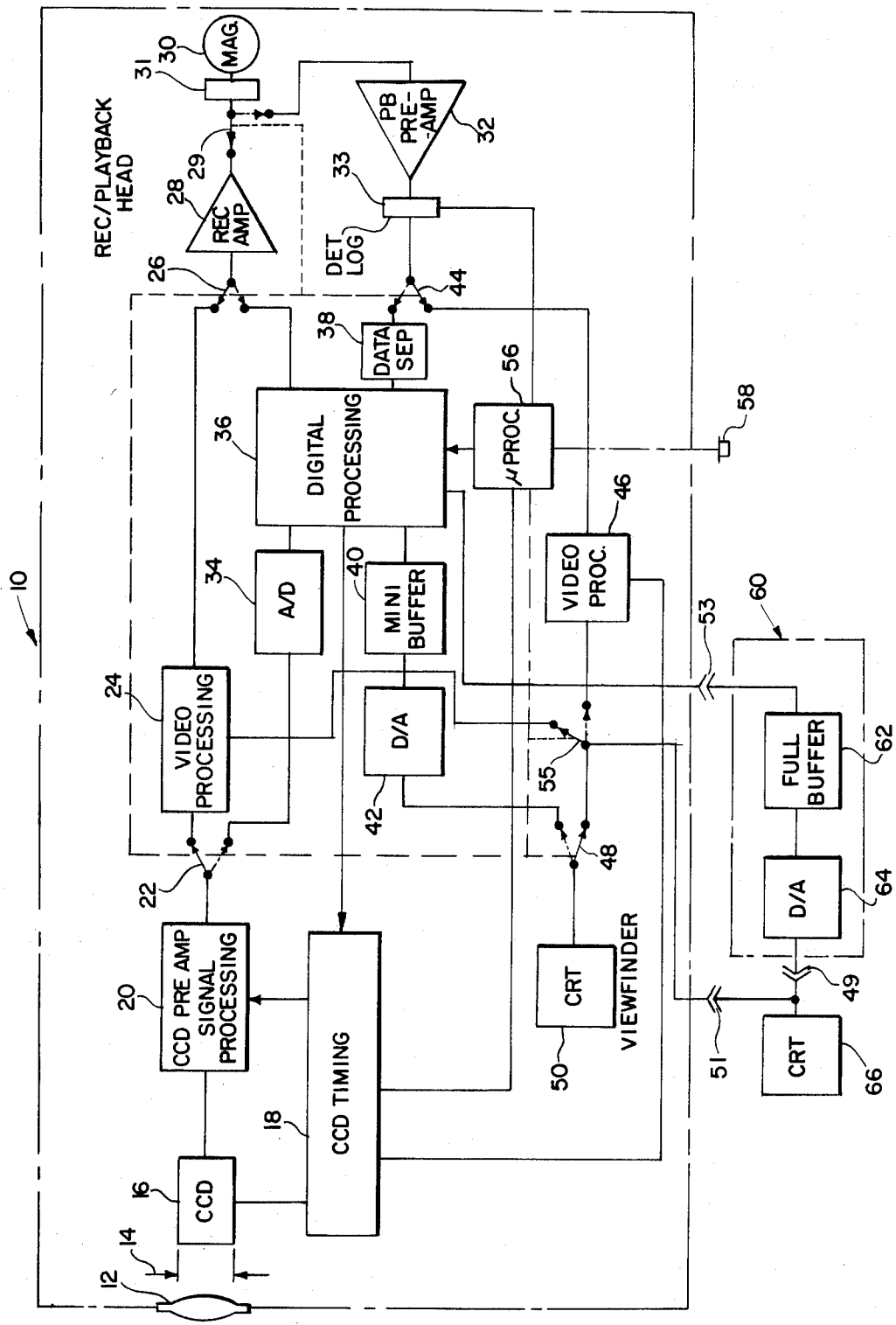

ELECTRONIC IMAGING CAMERA FOR RECORDING EITHER MOVING OR STILL IMAGES

BACKGROUND OF THE INVENTION

1. Field of the Invention

This invention relates generally to an electronic imaging camera for recording both moving and still images and, more particularly, to an electronic imaging camera for recording both continuous moving video images and still images in digital format.

2. Description of the Prior Art

Electronic video cameras for recording motion pictures on magnetic tape are well known in the art and in common usage today. Such cameras designed for home use record motion pictures on magnetic tape in so-called VHS or Beta format. Most recently, 8 mm format tape having a substantially smaller cassette size has been used resulting in corresponding reductions in camera size. Such motion picture video cameras do not have the capability of recording still images; and, although playback can be paused to provide a single still frame image, such paused images are of highly inferior quality and do not provide a satisfactory still image of the subject.

Electronic imaging cameras for recording still images have also been proposed. Such cameras can record a plurality of still images on a single magnetic disk or tape in either analog or digital format for subsequent playback on any well-known cathode ray tube viewing device. Such still images may be recorded in high resolution and are of a much higher quality than the single still frame images that can be provided by pausing a motion picture video tape to display a single frame. Although such electronic imaging still cameras can provide highly satisfactory still images, such cameras cannot be operated in a continuous video mode to provide moving images. Thus, if an individual desires to electronically record both continuous moving images and still images, he is required to purchase two different types of electronic imaging cameras.

Therefore, it is a primary object of this invention to provide an electronic imaging camera which provides the operator with the choice of recording either continuous video motion pictures or selected still images.

It is a further object of this invention to provide an electronic imaging camera which can record either continuous video motion pictures in analog format or high resolution still images in digital format.

It is an even further object of this invention to provide an electronic imaging camera in which continuous video moving images may be recorded and played back through an electronic viewfinder in the camera or a separate video display external to the camera or, alternatively, high resolution still images may be recorded and subsequently played back either through the electronic viewfinder in the camera in low resolution or the video display outside the camera in high resolution.

Other objects of the invention will be in part obvious and will in part appear hereinafter. The invention accordingly comprises a mechanism and system possessing the construction, combination of elements and arrangement of parts which are exemplified in the following detailed disclosure.

SUMMARY OF THE INVENTION

An electronic imaging camera apparatus comprises a photoresponsive means for continuously sensing image defining scene light and providing a continuous electronic information signal in response to the sensed scene light corresponding to the images defined by the scene light. Means are provided for storing the electronic signals. Means responsive to the continuous electronic information signal are provided for processing the continuous electronic information signal and thereafter directing the processed continuous electronic information signal to the storage means for storage therein. Means are provided for selectively interrupting the photoresponsive means from continuously sensing the image defining scene light so as to provide a still electronic information signal corresponding to the still image defined by the scene light at the instant immediately prior to the selective interruption. Means responsive to the still electronic information signal are provided for processing the still electronic information signal and thereafter directing the processed still electronic information signal to the storage means for storage therein.

Selectively responsive means provide from the storage means electronic signals defining either continuous images from the continuous electronic information signal or still images from the still electronic information signal. The camera may include an electronic viewfinder together with means for providing from the processed continuous electronic information signal, a first electronic signal to the electronic viewfinder for displaying images on the electronic viewfinder corresponding to the images defined by the scene light continuously sensed by the photoresponsive means. Means may also be included for providing from the processed and recorded still electronic information signal a second electronic signal to the electronic viewfinder for displaying a still image on the electronic viewfinder corresponding to the still image defined by the scene light at the instant immediately prior to the selected interruption.

The electronic imaging camera may be connected to an accessory for use with a video display device outside the camera. The accessory includes means for receiving the second electronic signal for further processing thereof. The processed second electronic signal is subsequently connected to the video display device in order to display a still image on the video display device corresponding to the still image defined by the scene light at the instant immediately prior to the selected interruption.

DESCRIPTION OF THE DRAWING

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawing wherein:

The drawing is a schematic block diagram showing the electronic imaging camera of this invention along with an accessory for connection thereto.

DESCRIPTION OF THE PREFERRED EMBODIMENT

Referring now to the drawing, there is shown generally at 10 a schematic block diagram for the electronic imaging camera of this invention. The camera comprises an objective taking lens 12 for viewing the scene to be electronically recorded and directing the image defining scene light rays to a two-dimensional photoresponsive area array preferably comprising a high resolution charge coupled device (CCD) 16. The high resolution CCD 16 is compatible for recording both continuous motion video in comparatively low resolution and still scenes in comparatively high resolution for digital processing as will become apparent from the following discussion. Transmission of the image defining scene light rays from the objective taking lens 12 to the CCD 16 is controlled by way of a conventional shutter 14 in a manner as will become apparent from the following discussion. The CCD 16 comprises a plurality of image sensing elements or pixels arranged in a two-dimensional area array wherein each image sensing pixel converts the incident image defining scene light rays into a corresponding analog voltage value. The analog voltage values for the pixels of the CCD 16 are thereafter serially transferred out of the CCD in a conventional manner by timing clock pulses provided from a CCD timing circuit 18 comprising a plurality of clock timing pulse generators. The electronic information output signal from the CCD 16 is serially transferred to a CCD preamp and signal processing circuit 20 wherein the electronic information signal is amplified and filtered in a well-known manner. In addition, a black or dark current reference voltage is also clamped to a select reference voltage level in a manner as is well known in the art. The black or dark current reference voltage is provided by masking the first 6 to 10 pixels in each row of the CCD 16 from light.

The electronic information output signal from the signal processing circuit 20 may thereafter be directed by way of a two-position mode select switch 22 to a video processing circuit 24. The video processing circuit 24, in turn, may provide gamma correction, automatic gain control (AGC) for amplifying signals detected under various light levels, and light color balance. The input electronic information signal to the video processing circuit 24 is converted from a base band signal to a composite modulated signal which may be in analog format appropriate for recording by any rotary head on a magnetic tape in any format such as VHS, Beta or 8 mm. The output signal from the video processing circuit 24 is directed by way of a two-position mode select switch 26 to a record amplifier 28 which operates to amplify the electronic information signal after which it is directed by another two-position mode select switch 29 for recording by a recording head 31 on an appropriate magnetic storage medium 30 such as a magnetic tape. The magnetic storage medium 30 of this invention is preferably 8 mm tape.

The output electronic information signal from the CCD signal processing circuit 20 can alternatively be directed by way of the two position mode select switch 22 to an analog-to-digital converter 34 which operates to convert the electronic information signal from an analog to a digital format. The electronic information signal is preferably digitized by the analog-to-digital converter 34 to an 8 bit per pixel format. The digitized electronic information signal from the analog-to-digital converter 34 is thereafter directed to a digital processing circuit 36. The digital processing circuit 36 corrects errors caused by defects in the CCD 16 in addition to performing in a digital manner signal processing functions such as those performed by the video processing circuit 24. A selected fraction of the digital image data comprising a low resolution representation of the image is thereafter directed to a mini-buffer memory 40. At the same time, the entire portion of the digital image data in the digital processing circuit 36 is appropriately formatted with additional information used for detection and correction of errors caused by the magnetic recording/playback process and is serialized to a modulation encoded signal suitable for recording on the magnetic storage medium 30. The appropriately formatted digital electronic information signal from the digital processing circuit 36 is thereafter directed by way of the two position mode select switch 26 to the record amplifier 28 for amplification prior to storage on the magnetic storage medium 30. The amplified digital electronic information signal is thereafter directed by way of the two-position mode select switch 29 for recording on the magnetic medium 30 by the recording head 31.

After an entire high resolution still image has been recorded in this fashion, a low resolution representation of it may be reproduced in an electronic CRT viewfinder display 50 by means of a signal directed from the mini-buffer memory 40 by way of a digital-to-analog converter 42.

Information to be stored on the magnetic medium 30 regardless of whether it is continuous motion video processed in analog form or a high resolution still image processed in digital form uses the single record amplifier 28 and magnetic recording head 31. In the same way information stored on the magnetic storage medium 30 whether it be analog motion video or a digital high resolution still image, may be retrieved by way of the playback head 31 and a pre-amplifier 32 which amplifies retrieved signal information. A detection logic circuit 33 determines whether the signal from the playback amplifier 32 represents analog or digital information and appropriately controls the operation of the camera 10. In the case where digitized electronic information signals are retrieved by the magnetic recording head 31 and playback pre-amplifier 32 from the magnetic storage medium 30 in the manner of this invention to be subsequently described, the amplified digitized electronic information signal is automatically directed by way of another twoposition mode select switch 44 to a data separation circuit 38 which operates to synchronize the data signals and thereby recover a clock signal from the digital data. The output signal from the data separation circuit 38 is thereafter directed to the digital processing circuit 36 which operates to deformat and deserialize the input data signals. In addition, the digital processing circuit also operates to provide a degree of error correction in a well-known manner to correct for drop outs, noise spikes, etc., which may result from flaws in the magnetic storage medium 30. The deserialized, deformatted and error corrected data signal from the digital processing circuit 36 is thereafter directed to the mini-buffer memory circuit 40 which stores a sample portion of the data signal. After a full frame of information is received by the mini-buffer 40, the information is read out of the mini-buffer 40 to a digital-to-analog converter 42 at a speed suitable for refreshing the (CRT) viewfinder display 50. The output signal from the digital-to-analog converter 42, in turn, is automatically directed by way of a two-position mode select switch 48 to the cathode ray tube (CRT) viewfinder display 50.

When the electronic signal information from the playback pre-amplifier 32 is continuous motion video in analog format, it will automatically be directed by way of the two-position mode select switch 44 to a video processing circuit 46 which can provide similar functions as the video processing circuit 24. The electronic information output signal from the video processor 46 is further directed by way of a two-position mode select switch 55 in serial connection with the mode select switch 48 to the CRT viewfinder display 50. The electronic information output signal from the video processor 46 is also directed by way of the mode select switch 55 to an output terminal 51 which, in turn, may connect to a full resolution color cathode ray tube (CRT) display 66.

The digital processing circuit 36 can also provide a high resolution digitized output signal to an output terminal 53. The output terminal 53, in turn, may connect to the input terminal of an accessory display unit 60 comprising a full buffer memory 62 in serial connection to a digital-to-analog converter 64. The output signal from the accessory display unit 60 may be directed to the full resolution color cathode ray tube display 66 by way of another releasably connectable terminal 49.

Operation of the electronic imaging camera 10 of this invention is controlled by way of a microprocessor 56 which may be externally controlled from a manual actuator 58. The electronic camera 10 may be operated in either a continuous video mode of operation in which moving images are continuously recorded on the magnetic storage medium 30 or in a still mode of operation in which a selected still image may be recorded in digital format on the magnetic storage medium 30. Assuming that the camera operator desires to use the camera in its continuous video mode of operation, he may move the mechanical actuator 58 to its appropriate position for continuous video recording so as to, in turn, activate the microprocessor 56 to provide the appropriate control signals to the mode select switches 22, 26, 29, 48 and 55 so as to establish the solid line connections as shown in the drawing. It will be readily understood that although the two-position mode select switches 22, 26, 29, 44, 48 and 55 are schematically shown as being mechanical switches, such need not be the case and the mode select switches may alternatively be solid state electronic devices electronically controlled by the microprocessor 56.

During the continuous video mode of operation, the camera shutter 14 is opened and image defining scene light rays are directed by the objective lens 12 in the usual manner to the CCD array 16. The electronic information output signal from the CCD array 16 is amplified and processed by the preamp signal processing circuit 20 in the aforementioned manner and thereafter directed by way of the mode select switch 22 to the video processing circuit 24. The electronic information signal is processed by the video processing circuit 24 in the aforementioned manner to provide gamma correction, automatic gain control and light color balance. The processed electronic information signal is thereafter directed by way of the mode select switch 26 to the record amplifier 28 from whence it is directed by way of the mode select switch 29 for recording on the magnetic storage medium 30 by the recording head 31. The processed electronic information signal from the video processing circuit 24 is also simultaneously directed by way of the mode select switches 48 and 55 to the CRT viewfinder display 50. Thus, the image displayed by the CRT viewfinder display 50 corresponds to the scene image detected by the CCD array 16 and provides the user with a continuous electronic image of the scene being recorded. The camera operator can therefore compose and frame the moving scene to be continuously recorded on the magnetic storage medium 30 by viewing the moving image continuously displayed on the CRT viewfinder 50. At the same time, the full resolution CRT display 66 may be connected to the output terminal 51 to provide additional means of monitoring the moving scene.

In the event that the camera operator frames and composes a moving scene he would like to make a still image thereof, he may manually activate the camera by way of the actuator 58 to change to its still recording mode of operation. In this case, the microprocessor 56 responding to the control input provided from the manual actuator 58 operates to switch the mode select switches 22, 26 and 48 from the solid line positions as shown in the drawing to their phantom line positions. Control signals are also provided to the digital processing circuit 36 and the CCD timing circuit 18 to slow the rate of data transfer from the CCD 16 to the preamp processing circuit 20 so as to be in synchronization with the formatting process provided by the digital processing circuit 36, and make use of the same record amplifier 28, playback preamp 32 and record playback head 31 as for the case of continuous motion video recording.

Once the proper CCD exposure level has been achieved, the shutter 14 is also closed for the duration of time required to serially transfer the still image data recorded by the CCD 16 at the instant immediately prior to the shutter's closing. The electronic signal information from the CCD array 16 is thereafter amplified and processed in the aforementioned manner by the preamp signal processing circuit 20 from whence it is directed by way of the mode select switch 22 to the analog-to-digital converter 34. The analog-to-digital converter 34, in turn, converts the electronic signal information from an analog-to-digital format in the aforementioned manner, and the digitized electronic information signal is thereafter formatted and serialized by the digital processing circuit 36. The output signal from the digital processing circuit 36, in turn, is directed by way of the mode select switches 26 and 29 and record amplifier 28 for recording on the magnetic storage medium 30 by the recording head 31. It will be readily understood that the CRT viewfinder display 50 is blank during the time that the still image data is transferred from the CCD 16 to the magnetic storage medium 30. After the still image data is recorded in the aforementioned manner, the electronic camera 10 may resume its continuous video mode of operation unless the operator deliberately continues to manually actuate the camera 10 to record another still image.

Immediately, after the still image has been recorded, a low resolution representation of it may also be viewed by the operator on the camera CRT viewfinder display 50 by means of the mini-buffer 40 and digital-to-analog converter 42 in a manner previously described.

If the camera user wishes to retrieve image information stored on magnetic medium 30, he may operate manual actuator 58 in such a way as to signal the microprocessor 56 to move the mode select switches 29 and 55 to their phantom line positions. This allows recorded information to be preamplified by preamp 32 and passed to detection logic circuit 33. If the image information is detected to be in digital format, the detection logic circuit 33 signals the microprocessor 56 to move the switches 44 and 48 to their phantom line positions. The digitized still image data is then directed by way of the mode select switch 44 to the data separation circuit 38 which operates in the aforementioned manner to extract both clock and data signals. The output signal from the data separation circuit 38, in turn, is directed to the digital processing circuit 36 where the digitized electronic information signal is deserialized and deformatted in the aforementioned manner. In addition, error correction is provided and the output signal is directed by way of the low resolution mini-buffer circuit 40 and digital-to-analog converter 42 to the CRT viewfinder display 50. The still image played back by the user is displayed in the CRT viewfinder 50 in low resolution thereby minimizing the cost and size required for the in-camera mini-buffer circuit 40.

The digitized electronic information signal from the digital processing circuit 36 is also directed by way of the interconnecting terminal 53 to the full buffer memory 62. The digitized electronic information output signal from the full buffer 62, in turn, is converted to an analog format by the digital-to-analog converter 64 and thereafter directed to the CRT 66 to provide a full resolution still image continuously refreshed by the full buffer memory 62.

Thus, in this manner there is provided an electronic imaging camera which may be utilized to record continuous moving images in analog format or still images in digital format. The continuous moving images may be viewed by an electronic viewfinder, and the recorded still images may be viewed in low resolution by the same electronic viewfinder utilized to view the continuous moving images. The camera may, alternatively, be connected to an accessory playback unit which, in turn, may connect to a large format CRT display for viewing the continuous moving images on the screen of the large CRT or, alternatively, viewing the still images in high resolution not otherwise available from the in-camera electronic viewfinder.

Other embodiments of the invention, including additions, subtractions, deletions and other modifications of the preferred disclosed embodiments of the invention will be obvious to those skilled in the art and are within the scope of the following claims.

What is claimed is:

1. An electronic camera apparatus comprising:
   photoresponsive means for continuously sensing image defining scene light and providing a continuous electronic information signal in response to the sensed scene light corresponding to the images defined by the scene light;
   means for storing electronic signals;
   means responsive to said continuous electronic information signal for processing said continuous electronic information signal and thereafter directing said processed continuous electronic information signal to said storage means for storage therein;
   an electronic viewfinder;
   means for providing from said processed continuous electronic information signal, a first electronic signal to said electronic viewfinder for displaying images on said electronic viewfinder thereby enabling the camera user to frame and compose the scene to be recorded as a continuous moving picture;
   means for selectively interrupting said photoresponsive means from continuously sensing said image defining scene light so as to provide a still electronic information signal corresponding to the still image defined by said scene light and displayed on said electronic viewfinder to the camera user at the instant immediately prior to said selective interruption;
   means responsive to said still electronic information signal for processing said still electronic information signal and thereafter directing said processed still electronic information signal to said storage means for storage therein; and
   selectively responsive means for providing: from said processed and stored continuous electronic information signals a second electronic signal to said electronic viewfinder for displaying continuous images on said electronic viewfinder corresponding to the moving images previously stored or from said processed and stored still electronic information signal a third electronic signal to said electronic viewfinder for displaying a still image on said electronic viewfinder corresponding to the still image defined by said scene light at the instant immediately prior to said selected interruption.

2. The camera apparatus of claim 1 wherein: said still electronic information signal is in analog format; said means for processing said still electronic information signal includes means for converting the analog format of said still electronic information signal to a digital format so that said still electronic information signal is stored in digital format; and said means for providing said third electronic signal to said electronic viewfinder includes means for converting the digital format of said stored still electronic information signal back to an analog format for display on said viewfinder.

3. The camera apparatus of claim 2 wherein said means for providing said third electronic signal to said electronic viewfinder further includes a mini buffer memory for providing said second electronic signal in low resolution thereby providing a low resolution display on said electronic viewfinder of said still image.

4. The camera apparatus of claim 3 wherein said means for storing electronic signals comprises magnetic tape.

5. An electronic camera apparatus for use with a video display device comprising:
   a first housing;
   photoresponsive means disposed within said first housing for continuously sensing image defining scene light and providing a continuous electronic information signal in response to the sensed scene light corresponding to the images defined by the scene light;
   means for storing electronic signals within said first housing;
   means disposed within said first housing responsive to said continuous electronic information signal for processing said continuous electronic information signal and thereafter directing said processed continuous electronic information signal to said storage means for storage therein;
   an electronic viewfinder;
   means for providing from said processed continuous electronic information signal, a first electronic signal to said electronic viewfinder for displaying images on said electronic viewfinder thereby enabling the camera user to frame and compose the scene to be recorded as a continuous moving picture;

means disposed within said first housing and selectively actuatable from without said first housing for interrupting said photoresponsive means from continuously sensing said image defining scene light so as to provide a still electronic information signal corresponding to the still image defined by said scene light and displayed on said electronic viewfinder to the camera user at the instant immediately prior to said selective interruption;

means disposed within said first housing responsive to said still electronic information signal for processing said still electronic information signal and thereafter directing said processed still electronic information signal to said storage means for storage therein;

means disposed within said first housing and selectively actuatable from without said first housing for providing outside said first housing either second or third electronic signals from said storage means, said second electronic signals defining said continuous images from said processed and stored continuous electronic information signals and said third electronic signals defining said still images in full resolution from said processed and stored still electronic information signal; and for providing within said first housing a fourth electronic signal in low resolution from said processed and stored still electronic information signal to said electronic viewfinder for displaying a low resolution image on said electronic viewfinder corresponding to the still image defined by said scene light at the instant immediately prior to said selected interruption;

a second housing; and means disposed within said second housing for receiving and processing said third electronic signals in said full resolution and then providing said third processed electronic signals for connection to the video display device when said third electronic signals are selectively provided from said first housing to define still images from said processed and stored still electronic information signal.

6. The camera apparatus of claim 5 wherein: said still electronic information signal is in analog format; said means for processing said still electronic information signal includes means for converting the analog format of said still electronic information signal to a digital format so that said still electronic information signal is stored in digital format; and said means for providing said fourth electronic signal to said electronic viewfinder includes means for converting the digital format of said stored still electronic information signal back to an analog format for display on said viewfinder.

7. The camera apparatus of claim 6 wherein said means for receiving and processing said third electronic signal includes a full buffer memory for providing said processed third electronic signal in said full resolution and means for converting said third electronic signal from a digital to an analog format.

8. The camera apparatus of claim 7 wherein said means for providing said fourth electronic signal to said electronic viewfinder further includes a mini buffer memory for providing said fourth electronic signal in said low resolution thereby providing said low resolution display on said electronic viewfinder of said still image.

9. The camera apparatus of claim 8 wherein said means for storing electronic signals comprises magnetic tape.

* * * * *